United States Patent Office 3,652,769
Patented Mar. 28, 1972

3,652,769
CYCLOALKYLAMINES IN THE TREATMENT OF MENTAL DISORDERS INVOLVING DEPRESSION AND COMPOSITIONS THEREFOR
Walfred S. Saari, Lansdale, Pa., assignor to Merck & Co., Rahway, N.J.
No Drawing. Filed Oct. 1, 1969, Ser. No. 862,943
Int. Cl. A61k 27/00
U.S. Cl. 424—325       13 Claims

ABSTRACT OF THE DISCLOSURE

A method for the treatment of depression comprising the administration of substituted cyclopentyl, cyclohexyl and cycloheptylamine compounds is disclosed. These compounds also exhibit a highly desirable degree of stimulation on the central nervous system. The preparation of pharmaceutical compositions containing these cycloalkylamines is also described.

SUMMARY OF THE INVENTION

This invention describes certain cycloalkylamines and their use in therapeutic compositions. In addition, this invention relates to the preparation of these cycloalkylamines. The compounds of this invention exhibit activity in laboratory models of depression in animals and therefore are useful in alleviating the symptoms associated with mental disorders involving depression. Furthermore, these same compounds are stimulants of the central nervous system.

BACKGROUND OF THE INVENTION

Depression can be a normal response to loss, but may arise without circumstantial cause. It is also associated with various physical diseases, especially diseases of a chronic and debilitating nature or those affecting the brain and nervous system. We have found that certain cycloalkylamines have the highly desirable physiological response of stimulating the central nervous system and of antagonizing laboratory analogs of depression in animals.

DESCRIPTION AND PREFERRED EMBODIMENT

This invention relates to a class of chemical compounds which are useful in treating depression. More particularly, it describes the method of treatment and compositions of substituted cyclopentyl, cyclohexyl and cycloheptylamines and their salts of the general Formula I:

(I)    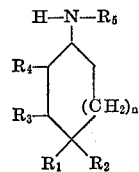

where $n$ is 0, 1 or 2;

$R_1$, $R_2$ and $R_3$ are hydrogen, alkyl (preferably a lower alkyl containing 1–6 carbon atoms), hydroxyalkyl (preferably hydroxyloweralkyl such as hydroxymethyl, hydroxyethyl, etc.), cycloalkyl (preferably cycloloweralkyl such as cyclopropyl, cyclohexyl, etc.), aryl (preferably phenyl, naphthyl or biphenyl), substituted aryl (preferably substituted with lower alkyl, lower alkoxy, halogen), aralkyl (preferably benzyl or phenethyl) or heterocyclo (preferably pyridyl, furyl, quinolinyl or isoquinolinyl); $R_1$ and $R_2$ together may form an alkylene chain (preferably a lower alkylene chain containing 2–6 carbon atoms), thus forming a spiroalkyl ring;

$R_1$ and $R_3$ or $R_1$ and $R_4$ together may form an alkylene chain (preferably a lower alkylene chain containing 2–5 carbon atoms which may be unsubstituted or substituted with a phenyl or substituted phenyl group), thus forming a bicyclic system;

$R_4$ is hydrogen or lower alkyl (preferably 1–6 carbon atoms; and $R_5$ is hydrogen or lower alkyl (preferably methyl or ethyl).

Also included in this invention are the geometrical isomers which result from the various possible cis or trans relationships between groups $R_1$, $R_2$, $R_3$, $R_4$ and the amine. In addition, the optical isomers into which each of these geometric isomers can be resolved are also included.

The preferred aspects of this invention relate to the cycloalkylamines and the salts thereof of the compounds of Formula I where $n$ is 0, 1 or 2;

$R_1$ is in a trans relationship to the amine and is methyl, ethyl, propyl, i-propyl, t-butyl, phenyl, substituted phenyl or hydrogen;

$R_2$ is hydrogen, methyl or ethyl;

$R_3$ is hydrogen, methyl, ethyl or phenyl;

$R_4$ is hydrogen;

$R_5$ is hydrogen, methyl or ethyl;

$R_1$ and $R_2$ together are pentylene;

$R_1$ and $R_3$ together are butylene; and $R_1$ and $R_4$ together are ethylene which may be unsubstituted or substituted with a phenyl or substituted phenyl group.

Representative compounds of this invention are as follows:

trans 4-phenylcyclohexylamine
4,4-dimethylcyclohexylamine
3-methyl-trans-4-methylcyclohexylamine
trans 4-ethylcyclohexylamine
trans 4-i-propylcyclohexylamine
trans 4-methyl-N-methylcyclohexylamine
4-methyl-trans-4-phenylcyclohexylamine
3-amino-spiro[5.5]undecane
cis-3-phenylcyclopentylamine
trans 3-phenylcyclopentylamine
cis-3,4,4-trimethylcyclohexylamine
4,4-diethylcyclohexylamine
trans-4,4-diethyl-2,N-dimethylcyclohexylamine
trans 4-methyl-cycloheptylamine
trans 3-(p-fluorophenyl)-cyclopentylamine
trans 4-phenylcycloheptylamine
2-amino-5-phenylbicyclo[2.2.1]heptane
trans β-decalylamine The above list of compounds are not the only ones covered by this invention and are to be considered to be only illustrations of the invention.

The product amines of this invention may be readily converted to their non-toxic acid adidition salts by customary methods in the art in order to provide a convenient solubility factor. The non-toxic salts of this invention comprise those salts containing acid components which are pharmacologically acceptable in the intended dosages. Such salts would include those prepared from hydrochloric acid, hydrobromic acid, sulfuric acid, nitric acid, phosphonic acid, oxalic acid, glycolic acid, lactic acid, salicylic acid, etc.

We have found that the compounds of structure I produce a highly desirable degree of stimulation on the central nervous system. The cycloalkyl amines of this invention when tested in a variety of behavioral situations show a marked activity, especially in primates. Such tests involve the effects on avoidance behavior of squirrel monkeys, Rhesus monkeys and rats and the random activity of rats.

The cycloalkylamines of this invention are also highly effective in reversing laboratory models of depression. The anti-depressant activity of the compounds of this invention was assessed by their ability to antagonize the depressant actions of tetrabenazine in mice as outlined by V. G. Vernier, H. M. Hanson and C. A. Stone in Psychosomatic Medicine, J. H. Nodine and J. H. Moyer, Ed., Lea and Febiger, Philadelphia, Pa., 1962, p. 683. This method is used widely for the evaluation of anti-depressant activity.

The performance of the cycloalkylamines of this invention in these assays indicates that they possess an effective level of anti-depressant and stimulant activity.

The cycloalkylamines of this invention can be administered orally, parenterally, or rectally. Orally, they may be administered in tablets, capsules, suspensions or syrups, the optimum dosage depending, of course, on the particular compound being used and the type and severity of the condition being treated. In any specific case, the appropriate dosage selected will further depend on factors of the patient which may influence response to the drug, for example, general health, age, weight, etc. Although the optimum quantities of the compounds of this invention to be used in such manner would depend on the compound employed and on the particular type of depressive condition treated, oral dose levels of preferred compounds in the range of 0.5–300 mg./day (preferably in the range of 3–100 mg./day) are desirable. Comparable dosages may be used in parenteral or rectal administration.

Dosage forms may be prepared according to any method known to the art for the manufacture of pharmaceutical compositions and such compositions may contain one or more agents; for example, sweetening agents, flavoring agents, coloring agents, preserving agents, etc. Further, the active cycloalkylamines may be administered alone or in admixture with other cycloalkylamines and/or non-toxic pharmaceutically acceptable excipients. Such excipients may be, for example, inert diluents such as calcium carbonate, lactose, etc., granulating and distintegrating agents; for example, maize starch, alginic acid, etc., lubricating agents; for example, magnesium stearate, talc, etc., binding agents; for example, starch, gelatin, etc., suspending agents; for example, methylcellulose, vegetable oil, etc., dispersing agents; for example, lecithin, etc., thickening agents; for example, beeswax, hard paraffin, etc., emulsifying agents; for example, naturally-occurring gums, etc. and non-irritating excipients; for example, cocoa butter and polyethylene glycols.

The cycloalkylamines of this invention can be prepared from the corresponding cycloalkanones by conversion to the oxime followed by reduction to the corresponding amine. These reactions may be carried out by any method well known in the art. The method of synthesis employed however will depend on the substituents present on the cycloalkyl ring. The synthesis is illustrated by the following reaction equation:

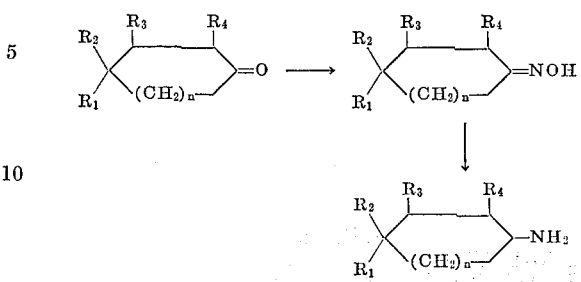

A preferred method of preparation is the conversion of a cycloalkanone to the oxime with hydroxylamine hydrochloride or sulfate in the presence of a base such as sodium acetate or pyridine. Conversion of the oxime to the primary amine succeeds with sodium and absolute ethanol at elevated temperatures or by catalytic reduction with hydrogen and an active catalyst such as Raney nickel, platinum oxide, etc. The catalytic reductions may be performed under pressure or at atmospheric pressure depending on the catalyst used.

The choice of reduction conditions is especially important when the cycloalkylamine products can exist as geometrical isomers, i.e. cis or trans configurations. The two methods of reduction are complementary in that sodium and alcohol reduction usually gives the most stable geometrical isomer while catalytic reduction frequently produces a different geometrical isomer.

Secondary and tertiary amines may be prepared from the primary amine by methods well known in the art.

For example, alkylation of amines is accomplished by treatment of the primary amine with an alkyl halide. Formation of secondary and tertiary amines can be carried out, depending on the conditions of the reaction. Other alkylation methods may be used; for example, reductive alkylation of the primary amine with an aldehyde or ketone. A preferred method of alkylation is reduction of an alkylamide with a borohydride reducing agent such as diborane or lithium aluminum hydride. The required amide can be prepared from the primary amine by reaction with an ester at elevated temperatures.

The products of this invention can contain asymmetric carbon atoms and therefore may be obtained as racemic mixtures of their dextro- and levorotatory isomers. These can be separated by any of the various known methods of resolution. A method that may be employed is combining the racemic compound with an optically active compound, for example, by salt formation. If the cycloalkylamines are added to an optically active acid, then the salts produced are enantiomers and possess different properties and different solubilities. They can usually be separated by fractional crystallization. When the enantiomers have been completely separated by repeated crystallization, the pure d- or l-amines are regenerated from the salts. It is to be understood that the said dextro and levo isomers of the cycloalkylamines are embraced within the scope of this invention.

Many of the starting materials of this invention are known and are available commercially or their syntheses can be found throughout the literature. However, the following methods of preparing the required cycloalkanones may be employed.

Synthesis of the cyclopentanones may be carried out by condensation of an acetoacetic ester with a substituted α-haloketone (preferably bromo) under basic conditions. Under these conditions, the α-hydrogen of the acetoacetic ester is readily substituted by the alkylating agent to give an α-substituted acetoacetic ester. Further treatment of the α-substituted acetoacetic ester with base gives the substituted 2-cyclopentenone. The 2-cyclopentenone thus formed may be reduced to the desired cyclopentanone with an appropriate active catalyst such as palladium on carbon or palladium on barium sulfate and hydrogen at atmospheric pressure. When various $R_2$, $R_3$ and $R_4$ substituents are desired, the appropriate $R_4$-substituted acetoacetic ester is used with the desired α-haloketone. The following reaction equation illustrates this method of preparation:

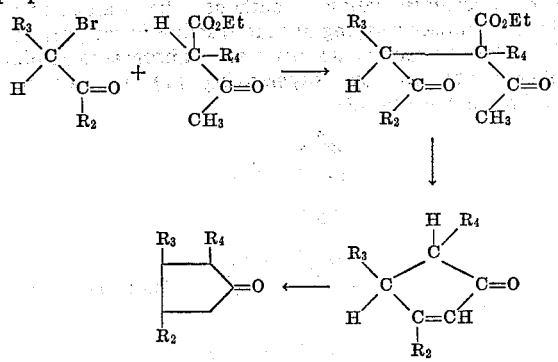

The cyclohexanones may be synthesized by a Michael condensation of methyl vinyl ketone with an aldehyde, followed by an Aldol condensation to form the cyclohexenone ring. Catalytic reduction of the double bond results in the substituted cyclohexanone. When various $R_1$, $R_2$, $R_3$ or $R_4$ substituents are desired, the appropriate α-substituted-aldehydes are condensed with the 3- and 4-substituted-3-buten-2-ones. Thus, for example, 2,2-dialkyl acetaldehydes condense with 3,4-dialkyl-3-buten-2-ones and after hydrogenation result in 2,3-dialkyl-4,4-dialkylcyclohexanones. The following reaction equations illustrate this preparation:

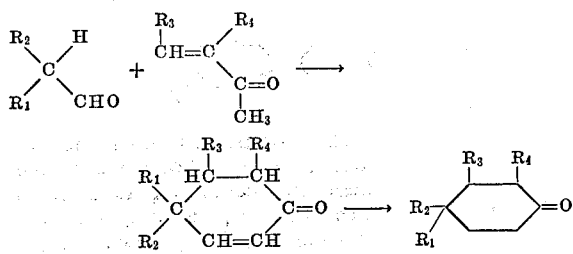

The cycloheptanones can be prepared by ring expansion of the cyclohexanones. Treatment of cyclohexanones with diazomethane results in the insertion of a methylene group adjacent to the carbonyl group. The following reaction illustrates this method of synthesis:

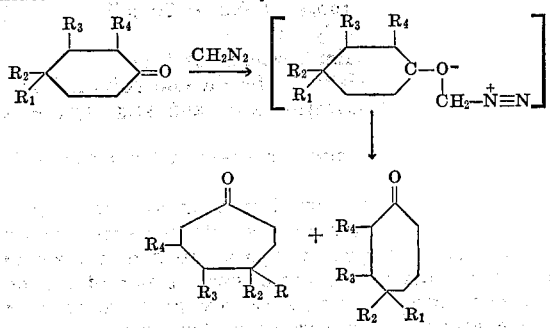

The following are detailed examples which show the preparation of the various compounds described in this invention. They are to be construed as illustrations of said compounds and not as limitations thereof.

EXAMPLE 1

4-methyl-4-phenylcyclohexanone

A solution of 50 g. (0.373 mole) of 2-phenylpropionaldehyde, 26.2 g. (0.375 mole) of freshly distilled methyl vinyl ketone and 40 ml. of water in methanol is added over 3 hours to a mixture of 1.39 g. of potassium hydroxide and 10 ml. of methanol at a rate such that the temperature of the reaction mixture does not exceed 40° C. After addition is complete, the reaction mixture is stirred at 60–70° C. for 30 minutes, cooled and extracted with ethyl ether. The ether extract is washed with water, dried over anhydrous sodium sulfate, filtered and concentrated. The residue is distilled through a Vigreux column to give 4-methyl-4-phenyl-2-cyclohexen-1-one, B.P. 128–130° C. at 1 mm.

A solution of 18.61 g. of the cyclohexenone in 150 ml. of absolute ethanol is hydrogenated in a Paar apparatus at an initial pressure of 22 p.s.i. and 25° C. over 1.86 g. of a 5%-palladium-on-barium sulfate catalyst until one equivalent of hydrogen has been taken up. Catalyst is removed by filtration, the filtrate is concentrated and the residue distilled through a Vigreux column to give 4-methyl-4-phenylcyclohexanone, B.P. 117–125° C. at 0.7 mm.; M.P. 40–42°.

EXAMPLE 2

When 2-phenylpropionaldehyde of Example 1 is replaced by the various aldehydes of Table I below, there is obtained the corresponding cyclohexanone product of Table II below.

TABLE I 2-(p-tolyl)-propionaldehyde
2-methylpropionaldehyde
2-methylbutyraldehyde
2-methylpentanal
propionaldehyde
butyraldehyde
2-i-propylacetaldehyde
2-phenylacetaldehyde
2-(p-methoxyphenyl)-acetaldehyde
2-(p-chlorophenyl)-acetaldehyde
2-(p-fluorophenyl)-propionaldehyde
2-(p-trifluoromethylphenyl)-propionaldehyde
2-ethylbutyraldehyde
2,2-diphenyl acetaldehyde
2-cyclopropylpropionaldehyde
2-cyclohexylacetaldehyde
2-cyclohexylpropionaldehyde
2-hydroxyethylpropionaldehyde
2-benzylpropionaldehyde
cyclohexanecarboxaldehyde
cyclopentanecarboxaldehyde
2-(2'-pyridyl)-propionaldehyde
2-(4'-pyridyl)-butyraldehyde
2-(2'-furyl)-acetaldehyde
2-(2'-quinolinyl)-propionaldehyde
2-(α-naphthyl)-acetaldehyde
2-(α-naphthyl)-propionaldehyde
2-(p-biphenyl)-propionaldehyde
2-cyclopropylacetaldehyde
2-(2'-pyridyl)-acetaldehyde

TABLE II 4-(p-tolyl)-4-methylcyclohexanone
4,4-dimethylcyclohexanone
4-ethyl-4-methylcyclohexanone
4-methyl-4-propylcyclohexanone
4-methylcyclohexanone
4-ethylcyclohexanone
4-i-propylcyclohexanone
4-phenycyclohexanone
4-(p-methoxyphenyl)-cyclohexanone
4-(p-chlorophenyl)-cyclohexanone
4-(p-fluorophenyl)-4-methylcyclohexanone
4,4-diethylcyclohexanone
4,4-diphenylcyclohexanone
4-cyclopropyl-4-methylcyclohexanone
4-cyclohexylcyclohexanone
4-cyclohexyl-4-methylcyclohexanone
4-hydroxyethyl-4-methylcyclohexanone
4-benzyl-4-methylcyclohexanone
spiro[5·5]dodecane-3-one
spiro[4·5]decane-8-one 4-(2'-pyridyl)-4-methylcyclohexanone
4-(4'-pyridyl)-4-ethylcyclohexanone
4-(2'-furyl)-cyclohexanone
4-(2'-quinolinyl)-4-methylcyclohexanone
4-(α-naphthyl)-cyclohexanone
4-(α-naphthyl)-4-methylcyclohexanone
4-(p-biphenyl)-4-methylcyclohexanone
4-cyclopropylcyclohexanone

EXAMPLE 3

4,4-diethyl-2-methylcyclohexanone

A solution of 50 g. (0.5 mole) of 2-ethylbutyraldehyde, 42 g. (0.5 mole) of 3-methyl-3-butan-2-one and 55 ml. of water in methanol is added over 3 hours to a mixture of 1.85 g. of potassium hydroxide and 15 ml. of methanol at a rate such that the temperature of the reaction mixture does not exceed 40° C. After addition is complete, the reaction mixture is stirred at 60–70° C. for 30 minutes, cooled and extracted with ethyl ether. The ether extract is washed with water, dried over anhydrous sodium sulfate, filtered and concentrated. The residue is distilled through a Vigreux column to give 4,4-diethyl-2-methyl-2-cyclohexen-1-one.

A solution of 25 g. of the cyclohexenone in 200 ml. of absolute ethanol is hydrogenated in a Paar apparatus at an initial pressure of 22 p.s.i. and 25° C. over 2.5 g. of a palladium-on-barium sulfate catalyst until one equivalent of hydrogen has been taken up. Catalyst is removed by filtration, the filtrate is concentrated and the residue distilled through a Vigreux column to give 4,4-diethyl-2-methylcyclohexanone.

EXAMPLE 4

When 3-methyl-3-buten-2-one or the various ketones of Table III below are used as the unsaturated carbonyl reactants in Example 3 and 2-ethylbutyraldehyde is replaced by the aldehydes of Examples 1 and 2, the corresponding cyclohexanone product is obtained. A representative list of the compounds prepared is shown in Table IV below.

TABLE III 3-ethyl-3-buten-2-one
3-penten-2-one
3-hexen-2-one
4-phenyl-3-buten-2-one
5-phenyl-3-penten-2-one
4-cyclohexyl-3-buten-2-one
4-(p-fluorophenyl)-3-buten-2-one

TABLE IV 2,4,4-triethylcyclohexanone
3,4,4-trimethylcyclohexanone
3-phenyl-4,4-diethylcyclohexanone
3-cyclohexyl-4,4-dimethylcyclohexanone
3-(p-fluorophenyl)-4,4-dimethylcyclohexanone
2,4-dimethyl-4-(2'-pyridyl)-cyclohexanone
2-methyl-4-cyclopropylcyclohexanone

EXAMPLE 5

4-methyl-4-phenylcyclohexanone oxime

A solution of 17.1 g. (0.091 mole) of 4-methyl-4-phenylcyclohexanone, 17 g. of hydroxylamine hydrochloride and 17 g. of sodium acetate in 90 ml. of water and 120 ml. of methanol is heated at reflux for 4 hours and then allowed to stand at 20–25° C. for 15 hours. The reaction mixture is warmed and water is added to induce crystallization. After cooling, the oxime is removed by filtration, dried and recrystallized from cyclohexane to give 4 - methyl - 4 - phenylcyclohexanone oxime (M.P. 73–75°).

*Analysis.*—Calcd. for $C_{13}H_{17}NO$ (percent): C, 76.81; H, 8.43; N, 6.89. Found (percent): C, 76.51; H, 8.30; N, 6.85.

EXAMPLE 6

When the cyclohexanones of Examples 2–4 are used in Example 5 in place of 4-methyl-4-phenylcyclohexanone, the corresponding cyclohexanone oxime is obtained.

EXAMPLE 7

4-methyl-trans-4-phenylcyclohexylamine hydrochloride

Sodium spheres, 4.5 g. are added to a solution of 4.0 g. (0.0197 mole) of 4-methyl-4-phenylcyclohexanone oxime in 50 ml. of absolute ethanol at a rate which allows the ethanol to reflux vigorously. After all of the sodium has dissolved, 50 ml. of dilute hydrochloride acid is added and most of the ethanol is removed under reduced pressure. The residue is extracted with ethyl ether to remove unreacted oxime, made basic with a 40% sodium hydroxide solution and extracted again with ethyl ether. The ether extract is washed with water, dried over anhydrous sodium sulfate, filtered and concentrated. The crude product is converted to the hydrochloride with ethanolic-hydrogen chloride, and precipitated with ethyl ether. Recrystallization from ethanol-ethyl ether gives pure 4-methyl-trans - 4 - phenylcyclohexylamine hydrochloride, M.P. 287.5–291.5° C., dec.

*Analysis.*—Calcd. for $C_{13}H_{19}N \cdot HCl$ (percent): C, 69.16; H, 8.93; N, 6.20. Found (percent): C, 68.84; H, 8.84; N, 6.16.

EXAMPLE 8

When the substituted cyclohexanone oximes of Example 6 are used in Example 7 in place of 4-methyl-4-phenylcyclohexanone oxime, the corresponding substituted cyclohexylamines of Table V below are obtained.

TABLE V 4-methyl-trans-4-(p-tolyl)-cyclohexylamine hydrochloride
4-methyl-trans-4-ethyl-cyclohexylamine hydrochloride
4-methyl-trans-4-propylcyclohexylamine hydrochloride
trans 4-methylcyclohexylamine hydrochloride
trans 4-ethylcyclohexylamine hydrochloride
trans 4-i-propylcyclohexylamine hydrochloride
trans 4-phenylcyclohexylamine hydrochloride
trans 4-(p-methoxyphenyl)-cyclohexylamine hydrochloride
trans 4-(p-chlorophenyl)-cyclohexylamine hydrochloride
4-methyl-trans-4-(p-fluorophenyl)-cyclohexylamine hydrochloride
4,4-dimethylcyclohexylamine hydrochloride
4,4-diethylcyclohohexylamine hydrochloride
4,4-diphenylcyclohexylamine hydrochloride
4-methyl-trans-4-cyclopropyl-cyclohexylamine hydrochloride
trans 4-cyclohexylcyclohexylamine hydrochloride
4-methyl-trans-4-cyclohexyl-cyclohexylamine hydrochloride
4-methyl-trans-4-hydroxyethyl-cyclohexylamine hydrochloride
4-methyl-trans-4-benzyl-cyclohexylamine hydrochloride
4,4-dicyclopropylcyclohexylamine hydrochloride
4-methyl-trans-4-(2'-pyridyl)-cyclohexylamine hydrochloride
4-ethyl-trans-4-(4'-pyridyl)-cyclohexylamine hydrochloride
trans 4-(2'-furyl)-cyclohexylamine hydrochloride
4-methyl-trans-4-(2'-quinolinyl)-cyclohexylamine hydrochloride
trans 4-(α-naphthyl)-cyclohexylamine hydrochloride
4-methyl-trans-4-(α-naphthyl)-cyclohexyalmine hydrochloride
4-methyl-trans-4-(p-biphenyl)-cyclohexylamine hydrochloride
trans 4-cyclopropylcyclohexylamine hydrochloride
trans 4,4-diethyl-2-methylcyclohexylamine hydrochloride
trans 2,4,4-triethylcyclohexylamine hydrochloride
cis 3,4,4-trimethylcyclohexylamine hydrochloride cis 3-methyl-trans-4-methylcyclohexylamine hydrochloride
cis 3-ethyl-trans-4-ethylcyclohexylamine hydrochloride
trans 2-methyl-trans-4-phenylcyclohexylamine hydrochloride
cis 3-phenyl-4,4-diethylcyclohexylamine hydrochloride
cis 3-cyclohexyl-4,4-dimethylcyclohexylamine hydrochloride
4,4-dimethyl-cis 3-(p-fluorophenyl)cyclohexylamine hydrochloride
trans 2-methyl-trans-4-(2'-pyridyl)-cyclohexylamine hydrochloride
trans 2-methyl-trans-4-cyclopropylcyclohexylamine hydrochloride
cis 3-methyl-trans-4-(p-chlorophenyl)-cyclohexylamine hydrochloride

EXAMPLE 9

Cis N-benzyl-4-phenylcyclohexylamine

A mixture of 8.0 g. (0.0459 mole) of 4-phenylcyclohexanone and 5.03 g. (0.0470 mole) of benzylamine in 60 ml. of xylene are heated at reflux for 15 hours under a Dean-Stark water trap to remove water formed in the reaction. Concentration of the xylene solution under reduced pressure gives the Schiff base of 4-phenylcyclohexanone and benzylamine.

A solution of 5.0 g. (0.0190 mole) of the Schiff base in 50 ml. of absolute ethanol is hydrogenated at 25–30° C. and an initial pressure of 21 p.s.i. with the aid of a 5% platinum on alumina catalyst. After one equivalent of hydrogen has been absorbed, catalyst is removed by filtration and the filtrate is concentrated under reduced pressure. The crude product is converted to the hydrochloride salt for purification. Recrystallization of the hydrochloride salt from ethanol-ethyl ether gives pure cis N-benzyl-4-phenylcyclohexylamine hydrochloride, M.P. 211–213° C.

Analysis.—Calcd. for $C_{19}H_{23}N \cdot HCl$ (percent): C, 75.58; H, 8.01, N, 4.64. Found (percent): C, 75.49; H, 7.65; N, 4.62.

EXAMPLE 10

Cis 4-phenylcyclohexylamine

A mixture of 1.0 g. of pure cis N-benzyl-4-phenylcyclohexylamine hydrochloride in 100 ml. of ethanol and 0.4 g. of a 10% palladium on carbon catalyst is hydrogenated at 25–30° C. and atmospheric pressure until uptake of hydrogen is complete. Catalyst is removed by filtration and the hydrochloride of cis 4-phenylcyclohexylamine is precipitated with ethyl ether. Further recrystallization from ethanol-ethyl ether gives the pure cis isomer, M.P. 232.0–233.0° C.

Analysis.—Calcd. for $C_{12}H_{17}N \cdot HCl$ (percent): C, 68.10; H, 8.57; N, 6.62. Found (percent): C, 68.09; H, 8.32; N, 6.60.

EXAMPLE 11

4-cyclohexyl-4-methylcycloheptanone

A solution of 14 g. of 4-cyclohexyl-4-methyl-cyclohexanone in 100 ml. of dry methanol is added slowly to a cold solution of 7 g. of diazomethane in 450 ml. of dry ethyl ether. After standing for two days at 20–25° C., unreacted diazomethane is decomposed with acetic acid and the ethyl ether solvent is removed under reduced pressure. Distillation of the residue through an efficient spinning band distillation column gives essentially pure 4-cyclohexyl-4-methylcycloheptanone

EXAMPLE 12

When 4-cyclohexyl-4-methylcyclohexanone of Example 11 is replaced by the cyclohexanones of Examples 1–4, there is obtained the corresponding cycloheptanone of Table VI below.

TABLE VI 4-methyl-4-phenylcycloheptanone
4-(p-tolyl)-4-mehylcycloheptanone
4-ethyl-4-methylcycloheptanone
4-methyl-4-propylcycloheptanone
4-methylcycloheptanone
4-ethylcycloheptanone
4-phenylcycloheptanone
4-(p-methoxyphenyl)-cycloheptanone
4-(p-chlorophenyl)-cyclopheptanone
4-(p-fluorophenyl)-4-methylcycloheptanone
4,4-diethylcycloheptanone
4,4-diphenylcycloheptanone
4-cyclopropyl-4-methylcycloheptanone
4-cyclohexylcycloheptanone
4-cyclohexyl-4-methylcycloheptanone
4-hydroxyethyl-4-methylcycloheptanone
4-benzyl-4-methylcycloheptanone
4-(2'-furyl)-cycloheptanone
4-(α-naphthyl)-cycloheptanone
4-(α-naphthyl)-4-methylcycloheptanone
4-(p-biphenyl)-4-methylcycloheptanone
4-cyclopropylcycloheptanone

EXAMPLE 13

When the substituted cyclohexanones of Examples 5 and 9 are replaced by the various cycloheptanones of Example 12 and the succeeding steps described in Examples 7 and 10 are carried out, the corresponding stereochemically pure cycloheptylamine hydrochlorides are prepared. A representative list of the compounds prepared is shown in Table VII below.

TABLE VII 4,4-diethylcycloheptylamine hydrochloride
trans 4-phenylcycloheptylamine hydrochloride
trans 4-methylcycloheptylamine hydrochloride
cis 4-(p-chlorophenyl)-cycloheptylamine hydrochloride
4-methyl-cis-4-phenylcycloheptylamine hydrochloride

EXAMPLE 14

3-(p-fluorophenyl)-cyclopentanone

A solution of 93 g. (0.715 mole) of ethylacetoacetate in 250 ml. of anhydrous ethyl ether is added slowly to a well stirred mixture of 13.95 g. (0.61 g.-atom) of sodium sand and 250 ml. of ethyl ether under an atmosphere of nitrogen. After addition is complete, the mixture is stirred at reflux for 30 minutes and then cooled in an ice-bath. A solution of 130 g. (0.60 mole) of p-fluorophenacyl bromide in 300 ml. of ethyl ether is added slowly. After addition is complete, the reaction mixture is stirred at reflux for 3 hours and water is added cautiously. The ether layer is separated, washed with fresh water, dried over anhydrous sodium sulfate and concentrated to give ethyl α-(p-fluorophenacyl)-acetoacetate as an oil.

Eighty grams of the crude ethyl α-(p-fluorophenacyl)-acetoacetate is added to 3.0 liters of an oxygen free 2% potassium hydroxide solution and heated at reflux for 1 hour under nitrogen. A solution of 400 g. of potassium hydroxide in 300 ml. of water is added and the reaction mixture is heated an additional 2 hours at reflux. After cooling, the product is extracted into ethyl ether, washed with water and dried over anhydrous sodium sulfate. Removal of the ether under reduced pressure and careful distillation of the residue through a Vigreux column gives pure 3-(p-fluorophenyl)-2-cyclopentenone.

Catalytic reduction of this cyclopentenone in ethanol with a 5% palladium-on-barium sulfate catalyst as described in Example 1 for reduction of the cyclohexenone, gives pure 3-(p-fluorophenyl)-cyclopentanone.

EXAMPLE 15

When the acetoacetic ester of Example 14 is replaced by ethyl α-mehyl acetoacetate, ethyl α-ethyl acetoacetate or ethyl α-(n-propyl)-acetoacetate, the products obtained are 2-methyl-4-(p-fluorophenyl)-cyclopentanone, 2-ethyl-4-(p-fluorophenyl)-cyclopentanone and 2-(n-propyl)-4-(p-fluorophenyl)-cyclopentanone.

EXAMPLE 16

When p-fluorophenacyl bromide of Examples 14 and 15 are replaced by the various alkylating agents of Table VIII below, there is obtained the corresponding cyclopentanone product. A repreentative list of these compounds is shown in Table IX below.

TABLE VIII phenacyl bromide
p-methoxyphenacyl bromide
2-(α-bromoacetyl)-pyridine

TABLE IX 3-phenylcyclopentanone
3-(p-methoxyphenyl)-cyclopentanone
3-(2-pyridyl)-cyclopentanone
2-methyl-4-phenylcyclopentanone
2-methyl-4-(p-methoxyphenyl)-cyclopentanone
2-ethyl-4-(2-pyridyl)-cyclopentanone

EXAMPLE 17

Synthesis of the stereochemically pure substituted cyclopentylamines is accomplished by using the cyclopentanones of Examples 14, 15 and 16 and the methods described in Examples 5, 7, 9 and 10 for the preparation of the substituted cyclohexylamines. A representative list of the compounds prepared is shown in Table X.

TABLE X trans-3-(p-fluorophenyl)-cyclopentylamine hydrochloride
cis-3-phenylcyclopentylamine hydrochloride
trans-3-phenylcyclopentylamine hydrochloride
2-ethyl-trans-4-phenylcyclopentylamine hydrochloride
cis-3-(p-methoxyphenyl)-cyclopentylamine hydrochloride
trans-3-(2-pyridyl)-cyclopentylamine hydrochloride

EXAMPLE 18

Spiro[5.5]undecane-3-one oxime

A mixture of 10.8 g. (0.065 mole) of spiro[5.5]undecane-3-one, 10.6 g. (0.153 mole) of hydroxylamine hydrochloride and 10.5 g. (0.128 mole) of sodium acetate in 65 ml. of water and 30 ml. of methanol is heated to reflux. After adding sufficient methanol for complete solution, the reaction is heated at reflux for 4 hours and then allowed to stand at 20–25° C. for 18 hours. The oxime is precipitated by adding water and cooling in an ice-bath. Recrystallization from methanol-water gives spiro[5.5]undecane-3-one oxime.

EXAMPLE 19

3-amino-spiro[5.5]undecane hydrochloride

A total of 9.5 g. of sodium spheres is added over 15 minutes to a stirred solution of 5.4 g. (0.0298 mole) of spiro [5.5]undecane-3-one oxime in 100 ml. of absolute ethyl alcohol under nitrogen. After all of the sodium has reacted, 100 ml. of dilute hydrochloric acid is added and most of the ethanol is removed under reduced pressure. The residue is extracted with ethyl ether, made basic with a 40% sodium hydroxide solution and the product extracted into ethyl ether. The ether extract is washed with water, dried over anhydrous sodium sulfate, filtered and concentrated. The oily residue is dissolved in an ethanolic-hydrogen chloride solution and the hydrochloride precipitated with ethyl ether to obtain 3-amino-spiro[5.5]undecane hydrochloride.

EXAMPLE 20

Spiro[4.5]decane-8-one and 2-methyl-spiro[5.5]undecane-3-one are used in place of spiro [5.5]undecane-3-one, and following the procedures of Examples 18 and 19, the products obtained are 8-amino-spiro[4.5]decane hydrochloride and trans 2-methyl-3-amino-spiro[5.5]undecane hydrochloride.

EXAMPLE 21

Trans-β-decalylamine hydrochloride

A solution of 4.67 g. (0.028 mole) of the oxime of trans-β-decalone in 50 ml. of anhydrous ethanol is treated with 5 g. of sodium as described in Example 19. The crude product is converted to the hydrochloride salt for purification by recrystallization from n-butanolethyl ether. After four recrystallizations, analytically pure trans-β-decalylamine hydrochloride, M.P. 240–245° C., is obtained.

Analysis.—Calcd. for $C_{10}H_{19}N \cdot HCl$ (percent): C, 63.30; H, 10.63; N, 7.38. Found (percent): C, 63.23; H, 10.47; N, 7.37.

EXAMPLE 22

2-amino-5-phenylbicyclo[2.2.1]heptane hydrochloride

Nortricylanone, 5.4 g. (0.050 mole), is added to a stirred suspension of 10 g. of aluminum chloride in 100 ml. of benzene and then heated at reflux for 45 hours. The cooled reaction mixture is poured onto ice and the crude product extracted into ethyl ether. After washing the ether extract with water several times, the ether solution is dried ($Na_2SO_4$), filtered and concentrated. Distillation of the residue through a Vigreux column gives 2-phenyl-norbornan-5-one, B.P. 100–101° at 0.2 mm.

The oxime of 2-phenyl-norbornan-5-one, prepared from the ketone in the usual manner, is treated with sodium and absolute ethanol according to the procedure of Example 19 to give crude 2-amino-5-phenylbicyclo[2.2.1]-heptane. Recrystallization of the hydrochloride salt of this amine from ethanol-ethyl ether gives an analytical sample, M.P. 255–259° C.

Analysis.—Calcd. for $C_{13}H_{17}N \cdot HCl$ (percent): C, 69.77; H, 8.11; N, 6.26. Found (percent): C, 70.08; H, 8.68; N, 6.37.

EXAMPLE 23

Trans N,4-dimethylcyclohexylamine hydrochloride

A mixture of 5.7 g. of trans 4-methyl cyclohexylamine and 20 ml. of methylformate is heated at reflux for 18 hours. Unreacted methylformate is removed under reduced pressure. The oily residue is dissolved in benzene and extracted with dilute hydrochloric acid to remove any unreacted trans 4-methylcyclohexylamine. After washing with water, the benzene extract is dried over anhydrous sodium sulfate, filtered and concentrated to give trans N-formyl-4-methylcyclohexylamine.

Reduction of this amide in ethyl ether with excess lithium aluminum hydride and isolation of the product in the usual manner gives trans N,4-dimethylcyclohexylamine as an oil. Conversion of the amine to the hydrochloride salt with an ethanolic-hydrogen chloride solution and recrystallization from ethanol-ethyl ether gives pure trans N,4-dimethylcyclohexylamine hydrochloride, M.P. 179–180° C.

Analysis.—Calcd. for $C_8H_{17}N \cdot HCl$ (percent): C, 58.69; H, 11.09; N, 8.56. Found (percent): C, 58.96; H, 10.72; N, 8.55.

The following examples are representative of the compositions of this invention.

EXAMPLE 24

Ten thousand tablets for oral use, each containing 50 mg. of trans 4-isopropylcyclohexylamine hydrochloride, are prepared from the following types and amounts of material:

| Ingredient: | Grams |
|---|---|
| Trans 4-isopropylcyclohexylamine hydrochloride | 500 |
| Lactose U.S.P. | 350 |
| Potato starch U.S.P. | 346 |

The mixture is moistened with an alcoholic solution of 20 grams of stearic acid and granulated through a sieve. After drying, the following ingredients are added.

| Ingredient: | Grams |
|---|---|
| Potato starch U.S.P. | 320 |
| Talcum | 400 |
| Magnesium stearate | 500 |
| Colloidal silicium dioxide | 64 |

The mixture is thoroughly mixed and compressed into tablets.

EXAMPLE 25

Five hundred ampoules each with two ml. of solution which contain 15 mg. of 4,4-diethylcyclohexylamine is prepared from the following types and amounts of materials.

| Ingredient: | Grams |
|---|---|
| 4,4-diethylcyclohexylamine hydrochloride | 7.5 |
| Ascorbic acid | 1 |
| Sodium bisulphite | 0.5 |
| Sodium sulphite | 1 |

The above ingredients are added to distilled water, diluted to 1 liter of solution and thoroughly mixed. The solution is used to fill ampoules which are sterilized hot in the usual way.

EXAMPLE 26

One thousand suppositories, each containing 25 mg. of trans 4-phenylcyclohexylamine hydrochloride are prepared by stirring 25 grams of trans 4-phenylcyclohexylamine hydrochloride into 2275 grams of molten coca butter and thoroughly stirring. The mixture is poured into chilled molds in the usual way and allowed to solidify.

EXAMPLE 27

An elixir in which each 5 ml. contains 50 mg. of 4-methyl trans 4-phenyl-cyclohexylamine hydrochloride is prepared by diluting 750 ml. of invert sugar with 100 ml. of water and adding to this 0.3 g. of benzoic acid and 10 g. of 4-methyl trans 4-phenyl-cyclohexylamine hydrochloride. 100 ml. of alcohol (U.S.P.) containing 0.2 g. of flavors is added and water is added to a total volume of 1 liter. The solution is thoroughly mixed, filtered, and bottled.

In a similar manner, the compounds of this invention may be converted into pharmaceutical compositions.

What is claimed is:

1. A method of treating human mental disorders involving depression which comprises administering to a patient affected by depression an effective amount of a compound of the formula

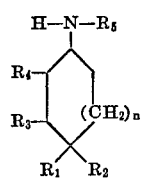

wherein $n$ is 0, 1 or 2;

$R_1$, $R_2$ and $R_3$ are hydrogen, lower alkyl, hydroxy alkyl, cycloalkyl or aryl;

$R_4$ is hydrogen or lower alkyl; and $R_5$ is hydrogen or lower alkyl or a pharmaceutically acceptable non-toxic salt.

2. A method of treating human mental disorders involving depression which comprises administering to a patient affected by depression an effective amount of a compound of the formula according to claim 1 wherein $n$ is 1 or 2; $R_1$ is lower alkyl; and $R_2$, $R_3$, $R_4$, and $R_5$ are hydrogen.

3. A method of treating human mental disorders involving depression which comprises administering to a patient affected by depression an effective amount of a compound of the formula according to claim 1 wherein $n$ is 0, 1 or 2; $R_1$ is phenyl; and $R_2$, $R_3$, $R_4$ and $R_5$ are hydrogen.

4. A method of treating human mental disorders involving depression which comprises administering to a patient affected by depression an effective amount of a compound of the formula according to claim 1 wherein $n$ is 1; $R_1$ and $R_2$ are lower alkyl; and $R_3$, $R_4$ and $R_5$ are hydrogen.

5. A method of treating human mental disorders involving depression which comprises administering to a patient affected by depression an effective amount of a compound of the formula according to claim 1 wherein $n$ is 1; $R_1$ and $R_3$ are lower alkyl; and $R_2$, $R_4$ and $R_5$ are hydrogen.

6. A method of treating human mental disorders involving depression which comprises administering to a patient affected by depression an effective amount of a compound of the formula according to claim 1 wherein $n$ is 1; $R_1$ is phenyl; $R_2$ is lower alkyl; and $R_3$, $R_4$ and $R_5$ are hydrogen.

7. A method of treating depression according to claim 6 wherein $R_1$ is in a trans configuration to the amine.

8. A pharmaceutical composition in a dosage form of a tablet, ampoule, suppository or elixir adapted for administration to obtain an antidepressant effect at a dosage level of 0.5–300 mg./day comprising an effective amount of at least one compound selected from the group consisting of the formula

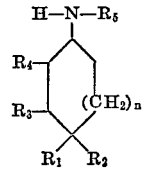

wherein $n$ is 0, 1 or 2;

$R_1$, $R_2$ and $R_3$ are hydrogen, lower alkyl, hydroxy alkyl, cycloalkyl or aryl;

$R_4$ is hydrogen or lower alkyl; and $R_5$ is hydrogen or lower alkyl and a pharmaceutically acceptable non-toxic salt in a non-toxic pharmaceutically acceptable excipient.

9. A pharmaceutical composition in dosage form adapted for administration to obtain an antidepressant effect at a dosage level of 0.5–300 mg./day according to claim 8 wherein $n$ is 1 or 2; $R_1$ is lower alkyl; and $R_2$, $R_3$, $R_4$, and $R_5$ are hydrogen.

10. A pharmaceutical composition in dosage form adapted for administration to obtain an antidepressant effect at a dosage level of 0.5–300 mg./day according to claim 8 wherein $n$ is 0, 1 or 2; $R_1$ is phenyl; and $R_2$, $R_3$, $R_4$ and $R_5$ are hydrogen.

11. A pharmaceutical composition in dosage form adapted for administration to obtain an antidepressant effect at a dosage level of 0.5–300 mg./day according to claim 8 wherein $n$ is 1; $R_1$ and $R_2$ are lower alkyl; and $R_3$, $R_4$ and $R_5$ are hydrogen.

12. A pharmaceutical composition in dosage form adapted for administration to obtain an antidepressant effect at a dosage level of 0.5–300 mg./day according to claim 8 wherein $n$ is 1; $R_1$ and $R_3$ are lower alkyl: and $R_2$, $R_4$ and $R_5$ are hydrogen.

13. A pharmaceutical composition in dosage form adapted for administration to obtain an antidepressant effect at a dosage level of 0.5–300 mg./day according to claim 8 wherein $n$ is 1; $R_1$ is phenyl; $R_2$ is lower alkyl; and $R_3$, $R_4$ and $R_5$ are hydrogen.

References Cited

Chem. Abst. (1), 57, Subject Index A–J, p. 771 S (1962).

Chem. Abst. (2), 69, 76496 M (1968).

STANLEY J. FRIEDMAN, Primary Examiner

U.S. Cl. X.R.

424—330; 260—563